US012631274B2

(12) United States Patent
Ketterling et al.

(10) Patent No.: US 12,631,274 B2
(45) Date of Patent: May 19, 2026

(54) ADJUSTABLE VALVED COUPLER FOR DRIP IRRIGATION

(71) Applicant: Kody J. Ketterling, Twin Falls, ID (US)

(72) Inventors: Kody J. Ketterling, Twin Falls, ID (US); Glen Grizzle, Murietta, CA (US)

( * ) Notice: Subject to any disclaimer, the term of this patent is extended or adjusted under 35 U.S.C. 154(b) by 13 days.

(21) Appl. No.: 18/645,344

(22) Filed: Apr. 24, 2024

(65) Prior Publication Data

US 2024/0353039 A1 Oct. 24, 2024

Related U.S. Application Data

(60) Provisional application No. 63/461,588, filed on Apr. 24, 2023.

(51) Int. Cl.
| | |
|---|---|
| *F16L 29/00* | (2006.01) |
| *A01G 25/02* | (2006.01) |
| *F16K 11/074* | (2006.01) |
| *F16K 31/60* | (2006.01) |
| *F16L 41/02* | (2006.01) |
| *F16L 43/00* | (2006.01) |

(52) U.S. Cl.
CPC ............ *F16L 29/007* (2013.01); *A01G 25/02* (2013.01); *F16K 11/074* (2013.01); *F16K 31/602* (2013.01); *F16L 41/021* (2013.01); *F16L 43/00* (2013.01)

(58) Field of Classification Search
CPC ....... F16L 29/007; F16L 41/021; F16L 43/00; A01G 25/02; F16K 11/074; F16K 31/602
See application file for complete search history.

(56) References Cited

U.S. PATENT DOCUMENTS

| | | | | |
|---|---|---|---|---|
| 1,010,819 A | * | 12/1911 | Thompson | A01G 29/00 |
| | | | | 405/39 |
| 2,558,663 A | * | 6/1951 | Olschewski | B05B 3/06 |
| | | | | 239/723 |

(Continued)

OTHER PUBLICATIONS

Mister Landscaper ½-in Polypropylene Barb-locking Collar Drip Irrigation Elbow, retrieved from https://www.lowes.com/pd/Mister-Landscaper-1-2-in-Polypropylene-Drip-Irrigation-Elbow/1101657 on Jan. 21, 2025.

(Continued)

*Primary Examiner* — Craig M Schneider
*Assistant Examiner* — Christopher D Ballman
(74) *Attorney, Agent, or Firm* — Burdick Patents, P.A.; Sean D. Burdick; Colin L. Honan

(57) ABSTRACT

An adjustable valved coupler for drip irrigation line includes a valve body having a first end connected to a selector switch assembly and a second end having multiple outlets of differing sizes positioned eccentrically about the perimeter of the second end. The selector switch assembly has an inlet cap defining a main port for connecting an upstream feeder line to an internal volume of the valve body, a manually operable dial, and a circular seat mechanically linked to the dial by a shaft. The circular seat defines an eccentrically positioned aperture. Rotation of the dial moves the aperture into and out of alignment with the outlets to adjust flow rate. The selector switch assembly may also include an exit port to allow serial coupling to a downstream feeder line.

20 Claims, 7 Drawing Sheets

(56)                    References Cited

U.S. PATENT DOCUMENTS

| | | | | |
|---|---|---|---|---|
| 2,668,078 A * | 2/1954 | Snoddy | B05B 15/74 | 239/487 |
| 3,586,239 A * | 6/1971 | Blass | A01G 25/023 | 239/487 |
| 3,604,728 A * | 9/1971 | Blass | F16L 55/00 | 405/36 |
| 3,791,587 A * | 2/1974 | Drori | A01G 25/023 | 239/553 |
| 3,998,427 A * | 12/1976 | Bentley | F16K 47/045 | 239/542 |
| 4,153,380 A * | 5/1979 | Hartman | A01G 25/06 | 405/39 |
| 4,196,853 A * | 4/1980 | Delmer | A01G 25/02 | 239/450 |
| 4,365,750 A * | 12/1982 | Carlberg | A01G 25/023 | 239/458 |
| 4,722,481 A * | 2/1988 | Lemkin | A01G 25/023 | 137/513.5 |
| 5,031,837 A * | 7/1991 | Hanish | A01G 25/023 | 239/542 |
| 5,054,690 A * | 10/1991 | Olson | A01G 25/02 | 239/602 |
| 5,137,216 A * | 8/1992 | Hanish | A01G 25/023 | 239/542 |
| 5,148,825 A * | 9/1992 | Gil | A01G 25/167 | 239/63 |
| 5,172,515 A * | 12/1992 | Lapshansky, Sr. | B05B 15/622 | 239/276 |
| 5,222,671 A * | 6/1993 | Smiley | A01G 25/02 | 239/533.1 |
| 5,267,690 A * | 12/1993 | Gazzoni | A01G 25/165 | 239/269 |
| 5,273,066 A * | 12/1993 | Graham | A01G 25/167 | 137/78.3 |
| 5,368,229 A * | 11/1994 | Hayes | B05B 15/65 | 239/242 |
| 5,762,314 A * | 6/1998 | Williams | F16K 7/17 | 251/367 |
| 5,794,848 A * | 8/1998 | Nunn | F16K 31/001 | 239/63 |
| 6,827,298 B2 * | 12/2004 | Sacks | A01G 25/02 | 239/443 |
| 8,371,325 B1 * | 2/2013 | Grizzle | F16K 31/001 | 47/79 |
| 9,253,950 B1 * | 2/2016 | Clark | B05B 1/3006 | |
| 9,258,949 B2 * | 2/2016 | Nourian | A01G 25/023 | |
| 9,462,762 B2 * | 10/2016 | Sheets | A01G 25/167 | |
| 9,695,965 B2 * | 7/2017 | Hadas | F16L 33/30 | |
| 9,821,335 B2 * | 11/2017 | Burrous | A01G 25/00 | |
| 9,949,448 B2 * | 4/2018 | Cohen | A01G 25/023 | |
| 10,435,999 B2 * | 10/2019 | Kenney | F16K 15/021 | |
| 10,820,536 B2 * | 11/2020 | Mora | F16K 31/088 | |
| 11,009,142 B2 * | 5/2021 | Emory | F16K 7/17 | |
| 11,274,781 B1 * | 3/2022 | Kamerath | F16L 37/0915 | |
| 12,115,546 B2 * | 10/2024 | Funseth | B05B 1/169 | |
| 12,253,182 B2 * | 3/2025 | Heffner | F16K 27/0236 | |
| 2007/0189852 A1 * | 8/2007 | Wolfley | A01G 25/02 | 405/36 |
| 2009/0242045 A1 * | 10/2009 | Jennings | F16K 27/0236 | 137/510 |
| 2010/0200676 A1 * | 8/2010 | Allen | A01G 25/023 | 239/542 |
| 2014/0263733 A1 * | 9/2014 | Shields | A01G 25/16 | 239/201 |
| 2016/0113218 A1 * | 4/2016 | Turk | B05B 1/20 | 239/542 |
| 2017/0332566 A1 * | 11/2017 | Emory | F16K 31/001 | |
| 2018/0125021 A1 * | 5/2018 | Marshall | A01G 27/006 | |

OTHER PUBLICATIONS

Raindrip Black Plastic Drip Irrigation Tee Fitting for ½, ⅝, and 0.710 inch Tubing or Dripline, Twist-On Nut, Maximum 50 PSI, retrieved from https://www.lowes.com/pd/Raindrip-Universal-Polypropylene-Drip-Irrigation-Tee/3396548 on Jan. 21, 2025.

* cited by examiner

SECTON A-A

SECTION B-B

ADJUSTABLE VALVED COUPLER FOR DRIP IRRIGATION

RELATED APPLICATIONS

This application claims priority to U.S. Provisional Application No. 63/461,588 filed Apr. 24, 2023, the contents of which are incorporated herein by reference.

BACKGROUND OF THE INVENTION

Field of the Invention

The present application relates generally to lawn irrigation apparatus, and more specifically to an adjustable flow valve for a drip irrigation system.

Description of Related Art

Drip irrigation systems are well known in the art as an alternative to conventional sprinkling systems. Drip irrigation provides better precision and efficiency for water distribution in environments such as gardens and partially planted landscapes by exposing irrigated roots to a direct supply of water. Rather than sprinkling water through the air under a relatively higher pressure and flow rate to saturate an area generally, drip irrigation releases water under a relatively low pressure and flow rate through drip emitters located on the ground in close proximity to the plants that are targeted for irrigation. Like conventional sprinkling systems, drip emitters are typically connected to a main water source by feeder lines and solenoid valves. But instead of constructing feeder lines from rigid conduit such as PVC, drip irrigation systems use a flexible hose that can be much more easily routed around a garden above ground.

The drip emitters and flexible feeder lines have different forms. Some drip emitters are rigid perforated terminals connected to the flexible feeder line, for example, by barbed hose connections, while others are simply holes formed at regular intervals directly into the flexible feeder line, which is also known as trickle hose. Trickle hose is flexible but strong enough to maintain its cylindrical form under pressure, and in this respect is pressure-compensating and suitable for use under relatively higher pressures and flows. A similar system known as drip tape uses flexible feeder line that resembles flat hose. Drip tape likewise includes emitter holes formed directly into the tape wall and spaced apart at regular intervals. Drip tape is designed for use exclusively in low flow, low pressure, non-pressure compensating systems.

While the amount of water that a conventional lawn sprinkler uses is measured in gallons per minute, the amount of water that a drip emitter uses is measured in gallons per hour. A conventional sprinkler will eject between one and five gallons of water per minute. By comparison, a drip emitter will pass about one-half gallon to six gallons of water per hour, thus releasing the water at a slow and steady rate. The slow drip provided by the emitter ensures that a much higher percentage of flow from the source will be released into the ground, with minimal evaporation, in specific locations to be absorbed into the roots and stems of nearby shrubbery.

Many different emitter designs have been produced in recent years. A main design basis for an emitter is to achieve a specified constant discharge over a specified range of pressure. Landscapers or gardeners are left to determine, essentially through trial and error, what size emitter or style of perforated feeder line to use in any particular area in need of irrigation. Adjustments are made manually, by disconnecting emitters determined to be of inadequate size, e.g, because they emit too much or too little flow, and manually replacing them with an emitter of a different size. This method creates an unfortunate inefficiency and waste of unneeded parts.

What is needed is an improved apparatus for drip irrigation that overcomes the inefficiencies of emitter installation trial and error.

SUMMARY OF THE INVENTION

The present invention improves drip irrigation systems by providing a specialized, adjustable flow valve that is configured for installation between a drip irrigation feeder line and one or more emitters served by the feeder line. The adjustable flow valve, also referred to herein as an "adjustable valved coupler" provides a user with an option to select a particular flow rate from among multiple flow rates made possible by the specialized valve.

In one embodiment, an adjustable valved coupler for a drip irrigation system includes the following elements: (1) a valve body having a first end and a second end, the valve body defining an internal cylindrical volume between the first end and the second end, and in addition, defining a longitudinal axis running centrally through the cylindrical volume; (2) an inlet extending from the valve body and configured for attachment to an upstream feeder line; (3) a manually operable selector switch attached to the first end of the valve body, the selector switch including a dial, a shaft, and a circular seat, wherein the shaft is coupled between the dial and the circular seat along the longitudinal axis so that rotation of the selector switch causes rotation of the circular seat, and wherein the circular seat abuts an internal surface of the second end of the valve body, the circular seat having an eccentrically located aperture defined therethrough; and (4) two or more outlets formed through the second end of the valve body non-concentrically with respect to the longitudinal axis.

More elaborate embodiments of the invention are also described. For example, an adjustable valved coupler according to the invention may have a valve body that includes a second port (or exit port) configured for attachment to a downstream feeder line. In another embodiment, the inventive valved coupler may include a compression spring that is configured to maintain the circular seat abutted against the internal surface of the second end of the valve body. In one implementation of the latter, the compression spring surrounds the shaft and extends between the first end of the valve body and the circular seat. In another implementation, the second end of the valve body may be a sleeve that couples to the first end of the valve body against force of the compression spring. Coupling of the sleeve to the first end of the valve body may be accomplished by any conventional means, such as by friction-fit, by threaded connection, or by the use of an adhesive.

In another embodiment of the invention, the second end of the valve body includes a baffling portion of sufficient area to block the eccentrically located aperture when the selector switch is rotated to an off position, at which the flow rate is zero. By way of example, the second end of the valve body may define three apertures, e.g., low-flow, medium-flow, and high-flow outlet apertures having diameters of about 0.05 inches, 0.08 inches, and 0.10 inches, respectively. The valved coupler is then configured so that the selector switch is rotatable among multiple predefined positions that each allow a different flow rate through the valve, each flow rate corresponding to substantial alignment of the eccentrically located aperture of the circular seat with one of the outlet apertures. In another embodiment, one of the predefined positions is no-flow, which corresponds to substantial alignment of the eccentrically located aperture with a baffling portion of the second end of the valve body.

In other embodiments of the invention, an adjustable valved coupler for a drip irrigation system may be any of the foregoing descriptions of the invention, wherein the at least two outlet apertures include any two of a low-flow aperture, a medium-flow aperture, and a high-flow aperture, and wherein (a) when the selector switch is rotated to the no flow position, the eccentrically located aperture is substantially blocked by a baffling portion of the second end of the valve body; (b) when the selector switch is rotated to the low flow position, the eccentrically located aperture substantially concentrically aligns with the low-flow aperture; (c) when the selector switch is rotated to the medium flow position, the eccentrically located aperture substantially concentrically aligns with the medium-flow aperture; and (d) when the selector switch is rotated to the high flow position, the eccentrically located aperture substantially concentrically aligns with the high-flow aperture. In another embodiment, the locations of the outlet apertures and baffling portion defined through or on the second end of the valve body may be separated from one another by a common angle. For example, the center point of each of the three outlet apertures and one baffling portion may be positioned about the longitudinal axis approximately every 90 degrees. Or, a valve having only two outlet apertures and a single baffling portion would separate the center points by approximately 120 degrees, or a valve having four outlet apertures and two baffling portions would separate the center points by approximately 60 degrees, etc.

In another embodiment, an adjustable valved coupler according to the present invention may include a second end of the valve body that is configured for coupling directly to a drip irrigation feeder line. The drip irrigation feeder line may be equipped with any conventional types of emitters, such as a rigid perforated terminal drip emitters, emitters formed in trickle hose, and emitters formed in drip tape.

In another embodiment, an adjustable valved coupler according to the invention may include a second end of the valve body that is configured to couple directly to the drip irrigation feeder line, for example, by friction fit within the flow channel of the feeder line. In one implementation, the second end of the valve body may have an outer diameter of about 0.40 inches. In one application of this embodiment, the valve body may be configured for coupling directly to an inlet end of a drip screw, i.e. a specialized emitter in the form of a rigid, hollow screw that has spiral threading formed along its outer length, emitters defined along a lower portion of the screw and through the screw wall to the hollow interior, and a coupling head at the top of the screw having an inlet port. For example, the inlet port may be a quarter-inch diameter hole that extend through the length of the screw defining its hollow interior flow channel, and the coupling head that surrounds the inlet port may be square, triangular, or hexagonal, to facilitate installation and extraction of the drip screw into soil using a similarly shaped tool.

In further embodiments, an adjustable valved coupler is disclosed. The valved coupler includes a valve body having a first end and a second end and defining an internal volume therebetween. A longitudinal axis is defined through the center of the valve body. A selector switch assembly may be connected to the first end of the valve body. The assembly has an inlet cap defining a main port that is in fluid communication with the internal volume. A dial is mechanically linked to a circular seat by a shaft extending longitudinally through the valve body. The circular seat includes an eccentrically located aperture defined therethrough. At least two outlets are defined through the second end and are positioned non-concentrically with respect to the central longitudinal axis.

The valved coupler may include a second port extending from the inlet cap in an opposite direction from the main port. Each of the main port and the second port are configured to attach to a feeder line. Preferably, the dial is manually operable. The dial may be positioned on the top surface of the inlet cap and an upper end of the shaft may extend through the inlet cap to attach to the dial. Preferably, the circular seat abuts an internal surface of the second end of the valve body. A compression spring may be used to maintain the positioning of the circular seat within the valve body. The compression spring may circumvolve the shaft between the inlet cap and the circular seat.

Movement of the dial causes the circular seat to similarly move within the valve body. Preferably, the dial is configured to move between at least three predefined positions, where the first two positions correspond to an alignment of the eccentrically located aperture with one of the two outlets and where the third position corresponds to an alignment of the eccentrically located aperture with a solid surface or baffle portion of the second end of the valve body. A user may therefore select a positive flow having a flow rate defined by the two outlets or no flow defined by the baffle portion.

In more elaborate embodiments, an adjustable valved coupler includes a valve body having an open first end and a second end defining multiple outlets eccentrically positioned around a perimeter of the second end. A manually operable selector switch assembly is attached to the open first end. The switch assembly has an inlet cap defining at least one port. The at least one port is configured to fluidically connect a feeder line to an internal volume of the valve body. The switch assembly also has a manually operable dial mechanically linked to a circular seat by a longitudinal shaft. The circular seat has an aperture defined therethrough and eccentrically located. The assembly is designed so that rotation of the dial causes the circular seat to also rotate thereby moving the eccentrically located aperture into and out of alignment with one of the multiple outlets defined through the second end.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions disclosed or shown are exemplary only. In the drawings, like reference numerals may designate like parts throughout the different views, wherein:

DETAILED DESCRIPTION OF THE INVENTION

The following disclosure presents exemplary embodiments of a specialized valve engineered for use in a drip irrigation system. According to the present invention, an adjustable flow valve a.k.a. an adjustable valved coupling is disclosed. Throughout the following disclosure, the invention may be referred to as an adjustable flow valve and an adjustable valved coupler interchangeably. The adjustable valve is engineered to have at least two selectable outlets that have different discharge rates. The adjustable valve includes an inlet that can be connected directly to a feeder line. The adjustable valve according to the present invention allows a user to connect a drip emitter to the feeder line and customize the discharge rate therefrom by selecting one of the defined outlets in the adjustable valve coupled to the drip emitter.

Figure 1:
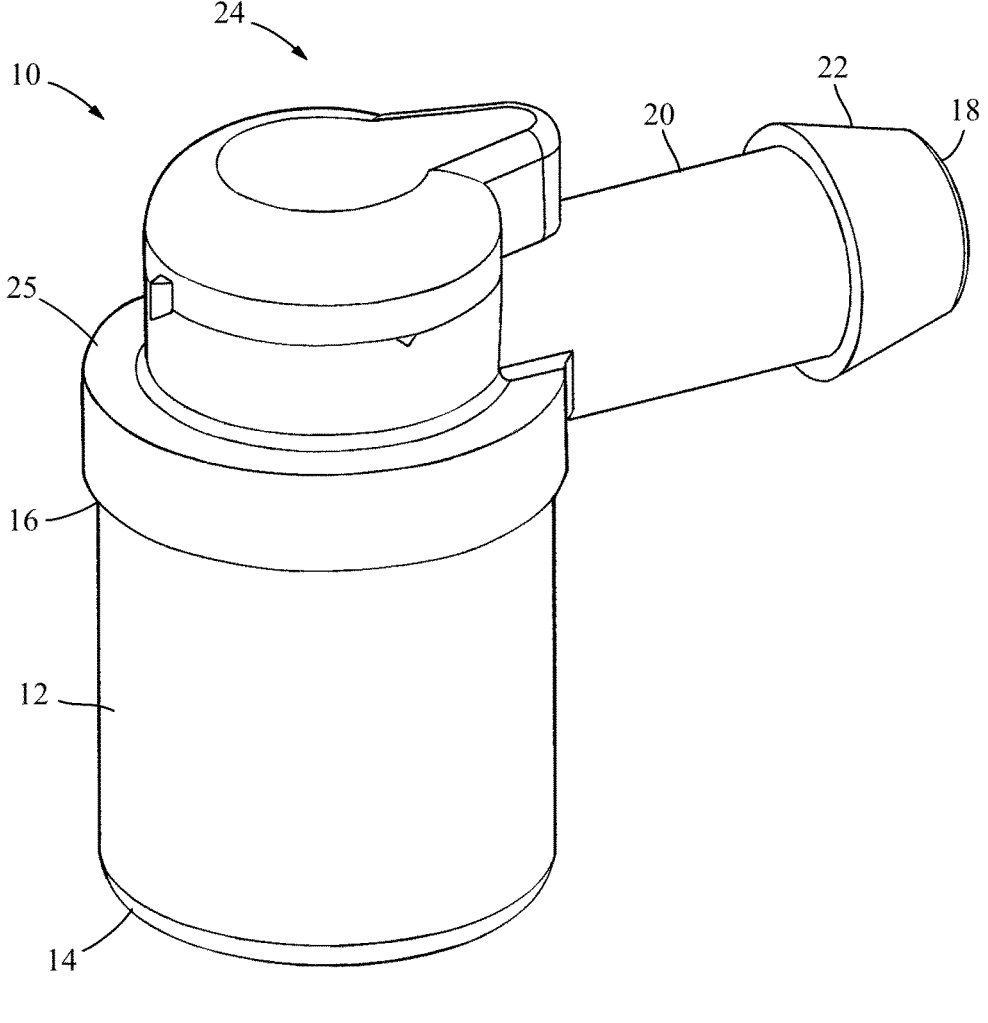
FIG. 1 is a perspective view of a first embodiment of an adjustable valved coupler according to the present invention.

FIG. 1 is a perspective view of a first embodiment of an adjustable valved coupler according to the present invention. The adjustable valved coupler 10 includes a valve body 12 having a lower end 14 and an upper end 16 defining an internal volume 11. In some embodiments, the valve body 12 has a generally cylindrical shape. A longitudinal axis is defined centrally through the valve body 12. A port 18 extends away from the valve body 12 and is in fluid communication with the internal volume 11. More precisely, a port 18 extends from the valve cap 25 engaged to the valve body 12 and fluidically links the internal volume 11 with the external environment. The port 18 is preferably configured to engage a feeder line to fluidically link the adjustable valve coupler 10 to a water source. In preferred embodiments, the port 18 is designed as a barbed inlet, including an arm 20 extending from the valve body 12 and a barbed end 22 formed at the terminal end of the arm. A selector switch assembly 24 is attached to the upper end 16 of the valve body 12. The selector switch assembly 24 is attached to and extends through the inlet cap 25 into the internal volume 11. The selector switch assembly 24 is manually operable by a user to allow for selection of the discharge rate.

Figure 2:
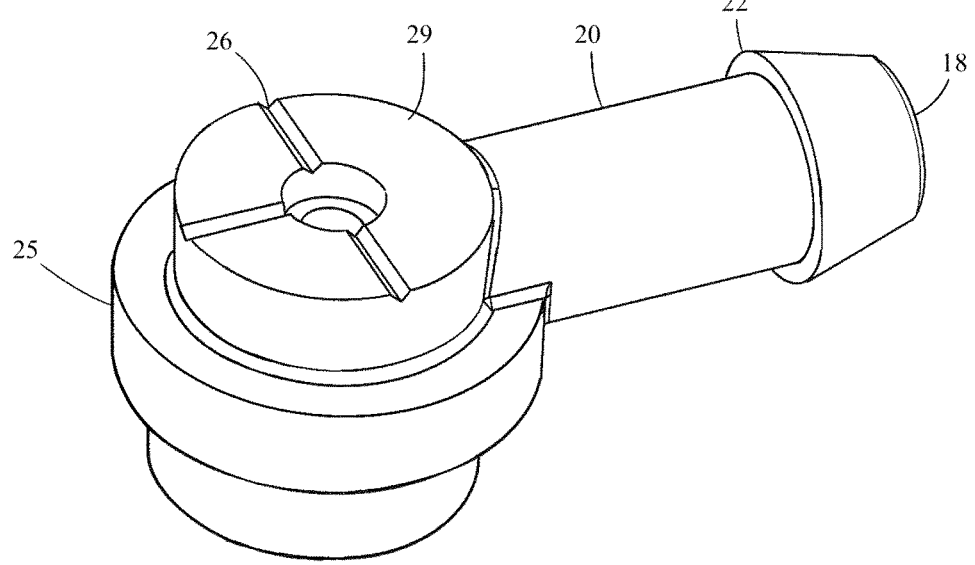
FIG. 2 is a perspective view of a first embodiment of an inlet cap according to aspects of the present invention, the inlet cap having been isolated from the adjustable valved coupler.
Figure 3:
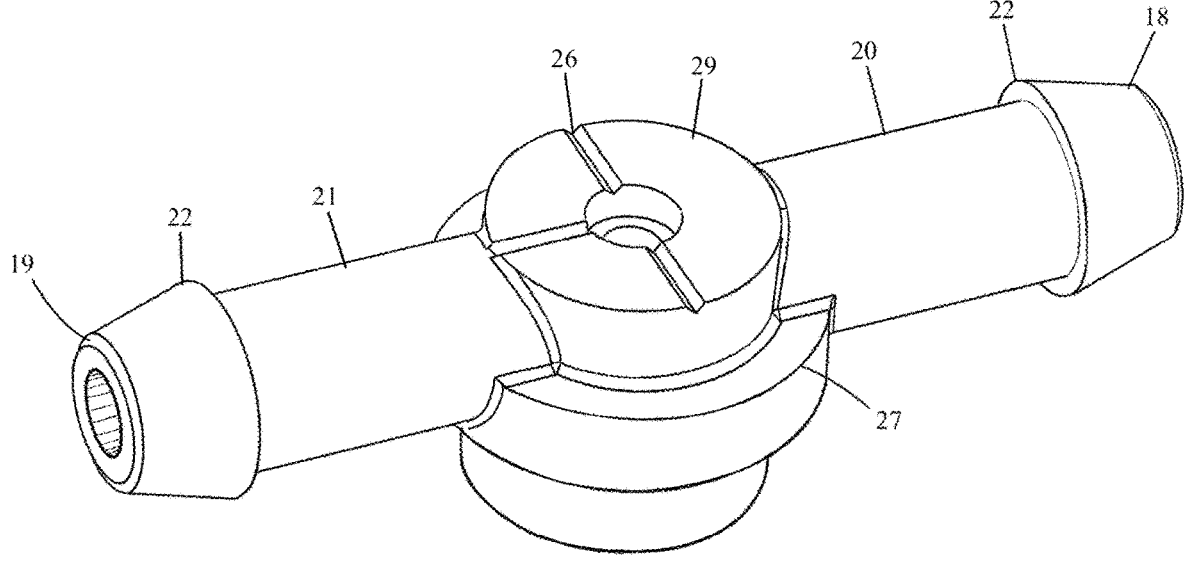
FIG. 3 is a perspective view of a second embodiment of an inlet cap according to aspects of the present invention, the second inlet cap having been isolated from the adjustable valved coupler.

FIG. 2 is a perspective view of a first embodiment of an inlet cap 25, isolated from the remaining components of the adjustable valved coupler 10, according to the present invention. FIG. 3 is a perspective view of a second embodiment of an inlet cap 27, isolated from the remaining components of the adjustable valve coupler 10, according to the present invention. The second inlet cap 27 is similar to the first inlet cap 25 in that both include a first arm 20 having a barbed end 22 defining port 18. The second inlet cap 27 further includes a second arm 21 that has barbed end 22 at the terminal end thereof and forms a second port 19. The second port 19 similarly fluidically connects the external environment with the internal volume 11 of the valve body 12. Preferably, the second port 19 extends in the opposite direction of the first port 18. The first inlet cap 25 may be said to have the general design of a conventional elbow coupler whereas the second inlet cap 27 has the general design of a T-coupler.

Each of the first inlet cap 25 and the second inlet cap 27 include at least one slot 26 predefined in the upper surface thereof. Preferably, there are three slots 26 predefined in the upper surface of the first inlet cap 25 and the second inlet cap 27. The selector switch assembly 24 is movable between each predefined slot 26. Each of the slots 26 correspond to a different flow rate, as explained in more detail below. Preferably, each slot 26 is separated from each adjacent slot by a common angle. Some embodiments may further include a solid surface 29 corresponding to a no-flow selection, as detailed further below.

Figure 4:
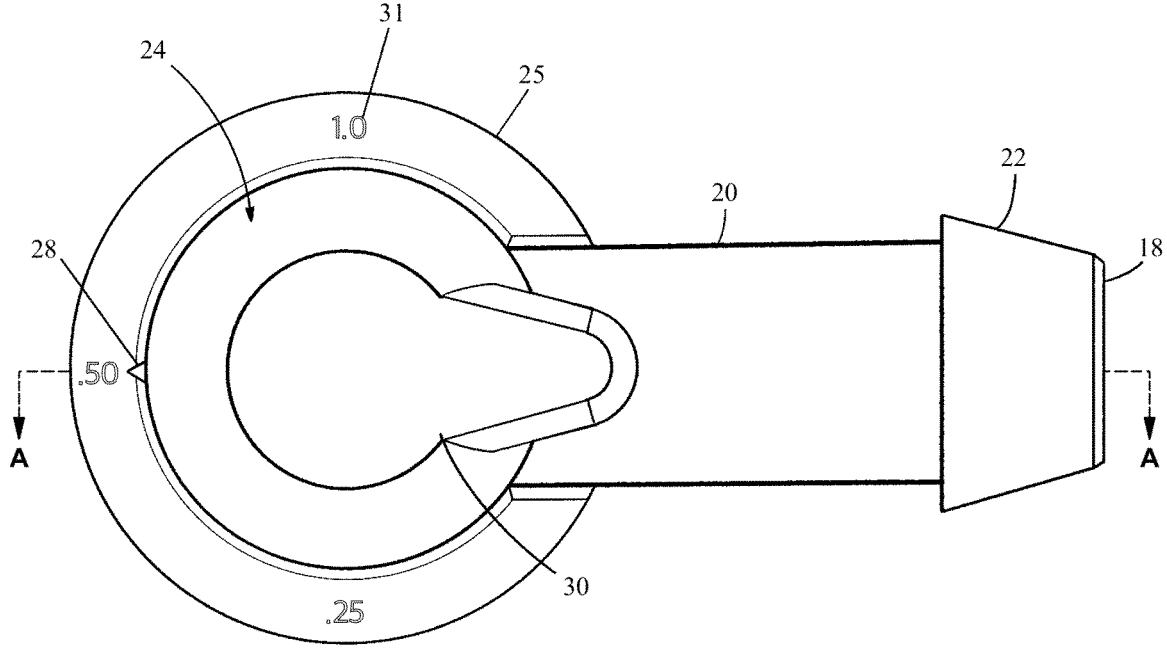
FIG. 4 is a top view of the first embodiment of the adjustable valved coupler.

FIG. 4 is a top view of an embodiment of the adjustable valved coupler 10 according to the present invention. The selector switch assembly 24 includes the inlet cap 25 connected to the upper end 16 of the valve body 12. A dial 30, which includes a tab 28, is attached to the inlet cap 25. The inlet cap 25 may include indicia 31 stamped around the outer ledge thereof. The indicia 31 aligns with a position of one of the predefined slots 26 and corresponds to a flow rate defined by an outlet formed through the lower end 14 of the valve body. The tab 28 will align with the selected indicia 31 to provide the user with a visible indication of the selected flow rate.

Figure 5:
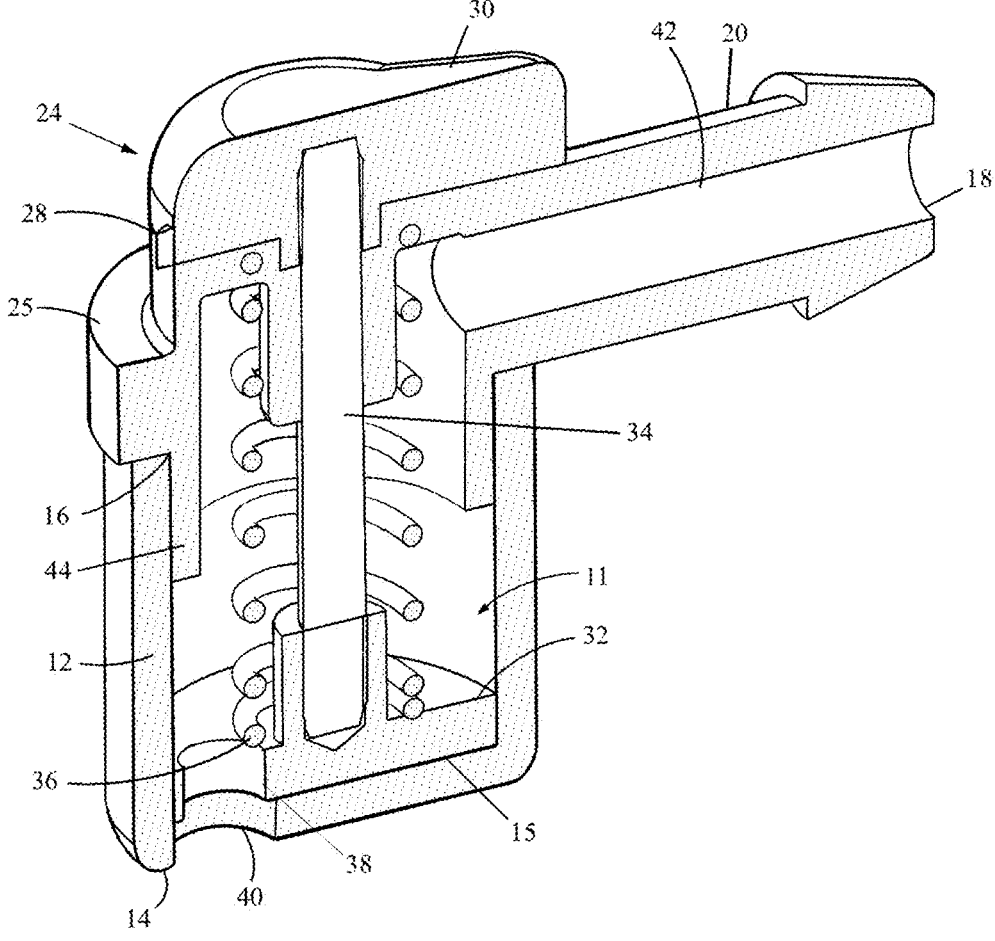
FIG. 5 is a cross-sectional perspective view of the first embodiment of the adjustable valved coupler, taken along lines A-A marked in FIG. 4.

FIG. 5 is a cross-sectional perspective view of an embodiment of the adjustable valved coupler 10, taken along line A-A in FIG. 4. An internal channel 42 is defined through the arm 20 to connect the port 18 to the internal volume 11 of the valve body. The selector switch assembly 24 includes the dial 30, a circular seat 32, and a shaft 34 extending through the inlet cap 25. The shaft 34 mechanically links the dial 30 to the circular seat 32. Rotation of the dial 30 is therefore translated to the circular seat 32 by the shaft 34. The circular seat 32 abuts the internal surface of the lower end 14 of the valve body 12, i.e., inner lower surface 15. Preferably, the shaft 34 extends longitudinally between the dial 30 and the circular seat 32 and is substantially aligned with the central longitudinal axis of the valve body 12. A compression spring 36 circumvolves the shaft 34 between the dial 30 and the circular seat 32. The compression spring 36 maintains the positioning of the circular seat 32 against the inner lower surface 15 of the valve body 12.

An aperture 38 is defined through the circular seat 32. Preferably, the aperture 38 is eccentrically located and defined through the seat 32 off-axis with regard to the central longitudinal axis. At least one outlet 40 is defined through the lower end 14 of the valve body 12. The outlet 40 is eccentrically located and formed off-axis with regard to the central longitudinal axis. In preferred embodiments, there are multiple apertures defined through the lower end 14 of the valve body 12 to form multiple outlets through the second end, as explained in more detail below.

The inlet cap 25 further includes a sleeve 44 formed about the lower end thereof. The sleeve 44 engages the inner surface of the upper end 16 of the valve body 12 to securely connect the inlet cap 25 thereto. In preferred embodiments, the inlet cap 25 is press-fit into engagement with the valve body 12. Thus, the outer diameter of the sleeve 44 is preferably substantially equal to the inner diameter of the upper end 16 of the valve body 12. In some embodiments, an adhesive may be applied to the sleeve 44 prior to engaging the valve body. In some alternative embodiments, the inlet cap 25 may be welded to the valve body 12 at the location of the sleeve 44.

Figure 6:
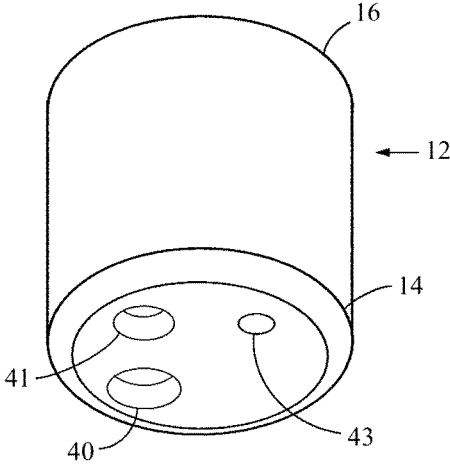
FIG. 6 is a lower perspective view of an embodiment of a valve body according to the present invention, the valve body having been isolated from the adjustable valved coupler.

FIG. 6 is a lower perspective view of an embodiment of the valve body 12 according to the present invention. The lower end 14 of the valve body 12 includes multiple apertures defining at least two outlets. In more preferred embodiments, the lower end 14 includes three outlets 40, 41 and 43 defined therethrough. The lower end 14 of the valve body 12 may therefore be described as a multi-aperture outlet end or a multi-outlet end. Each outlet 40, 41 and 43 is positioned non-concentrically with regard to the central longitudinal axis. Each outlet 40, 41 and 43 has a different diameter. For example, the first outlet 40 may have a diameter substantially equal to 0.100 inches whereas the second outlet 41 may have a diameter substantially equal to 0.080 inches and the third outlet 43 may have a diameter substantially equal to 0.050 inches. The difference in diameters among the three outlets 40, 41 and 43 corresponds to the differing flow rates that may be selected by a user manipulating the selector switch assembly 24.

In preferred embodiments, the aperture 38 formed through the circular seat 32 has a diameter equal to or greater than the largest diameter among the outlets 40, 41, or 43 so that flow through a selected outlet is limited by the outlet and not by the aperture. Thus, in the example embodiment described above, the aperture 38 may have a diameter at least equal to 0.100 inches. In alternative embodiments, the diameter of the aperture 38 may be larger or smaller than 0.100 inches, depending on the diameter of the largest outlet.

Figure 7:
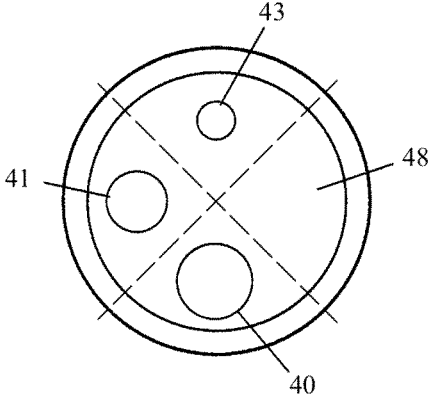
FIG. 7 is a top view of the valve body from FIG. 6.

FIG. 7 is a top view of an embodiment of the valve body. The multi-aperture outlet end 14 of the valve body 12 may be divided into equal quadrants around the central longitudinal axis. Each outlet 40, 41 and 43 occupies one of the quadrants while the fourth quadrant is a solid surface or a baffle surface 48. The baffle surface 48 blocks the discharge of water from the valve body 12 and corresponds to a "no flow" position, e.g., solid surface 29, of the selector switch assembly 24.

In use, rotation of the dial 30 causes the circular plate 32 to similarly rotate within the valve body 12. A user may continue rotating the dial 30 until positioned in one of the slots 26. Depending on which slot 26 the dial 30 is rotated into, the aperture 38 will align with one of the outlets 40, 41 or 43 or will align with the baffle surface 48. The indicia 31 stamped in the inlet cap 25 provides the user with a visible indication of the selected flow rate. Thus, the user may select from among a no flow position (baffle surface 48), a low flow position (outlet 43), a medium flow position (outlet 41) and a high flow position (outlet 40). The tab 28 will point in the direction of the selected flow rate indicia 31. In use, when the dial 30 is rotated to the no flow position, the eccentrically located aperture 38 is substantially blocked by the baffle surface 48; when the dial 30 is rotated to the low flow position, the eccentrically located aperture 38 is substantially concentrically aligned with the low-flow outlet 43; when the dial 30 is rotated to the medium flow position, the eccentrically located aperture 38 is substantially concentrically aligned with the medium-flow outlet 41; and when the dial 30 is rotated to the high flow position, the eccentrically located aperture 38 is substantially concentrically aligned with the high-flow outlet 40. Thus, a user can select a desired flow rate or no flow for the individual drip emitter connected to the drip irrigation system by an adjustable valved coupler 10.

The adjustable valved coupler 10 is particularly useful in gardens or other types of landscaping where different vegetation has been planted. The adjustable valved coupler 10 allows a user to set the flow rate delivered to first drip emitter connected to a common feeder line without disrupting or interfering with any upstream and downstream drip emitters on the same line. Each drip emitter connected to the feeder line using an adjustable valved coupler 10 can have its flow rate set without impacting the flow rates of other emitters on the same line.

Figure 8:
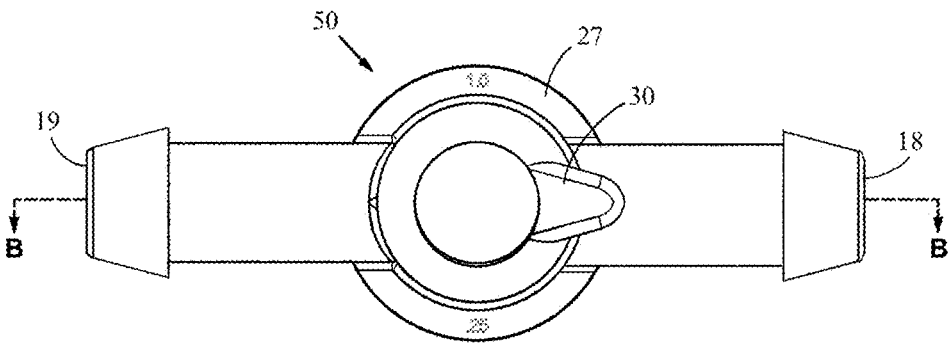
FIG. 8 is a top view of an alternative embodiment of a two-port adjustable valved coupler according to the present invention.
Figure 9:
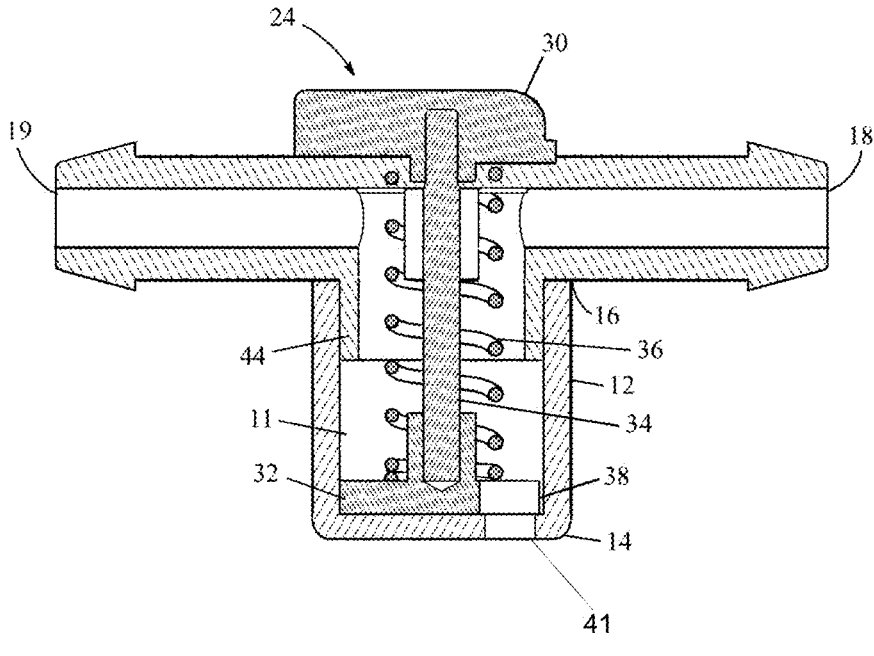
FIG. 9 is a cross-sectional view of the two-ported adjustable valved coupler, taken along lines B-B marked in FIG. 8.

FIG. 8 is a top view of an alternative embodiment of a two-ported adjustable valve coupler 50 according to the present invention. The two-ported adjustable valve coupler 50 is similar to the adjustable valve coupler 10 but includes the inlet cap 27 having opposing ports 18 and 19 to form a T-coupler. FIG. 9 is a cross-sectional view of the adjustable valve coupler 50, taken along line B-B of FIG. 8. As can be seen from FIG. 9, the selector switch assembly 24 is the same as described above and includes the dial 30, the circular seat 32 and the shaft 34 mechanically linking the dial to the seat. The aperture 38 is defined through the circular seat 32 and is similarly eccentrically located. Further, the valve body 12 remains the same and includes an upper end 16 in press-fit engagement with the inlet cap 27. Further, the lower end 14 of the valve body includes at least one outlet 40 formed off-axis with regard to the central longitudinal axis. In preferred embodiments, such as those described above, the lower end 14 includes multiple apertures defined therethrough to form a multi-outlet end.

Each of the main port 18 and the second or exit port 19 are in fluid communication with the internal volume 11 of the valve body. Water may be introduced at one port, e.g., main port 18, where it will flow into the internal volume 11 of the valve body 12. The water can thereafter be discharged through one of the outlets 40, 41 or 43 and through the second port 19. A feeder line can be attached to the second port 19 to fluidically link the two-ported adjustable valved coupler 50 to the next in-line drip emitter. Note, either the main port 18 or the second port 19 will act as an inlet to the two-ported adjustable valved coupler 50 while the other port acts as an outlet depending on the direction of the water source.

Use of the two-ported adjustable valved coupler 50 is also substantially the same in that rotation of the dial 30 causes the circular seat 32 to rotate. Rotation may continue until the dial engages one of the slots 26 formed in the top surface of the inlet cap 27. Depending on which slot 26 is engaged, the aperture 38 will be aligned with one of the outlets 40, 41 and 43 or the baffle surface 48. The outlets and baffle surface similarly correspond to no flow (baffle surface 48), low flow (outlet 43), medium flow (outlet 41) and high flow (outlet 40), as described above. Regardless of the flow rate selected, water introduced at the main port 18 may continue to be discharged from the second port 19.

The two-ported adjustable valved coupler 50 is particularly useful for drip emitters deployed in series so that a common feeder line can be used to connect multiple emitters. In contrast, the adjustable valved coupler 10 is useful at the end of the series, or with a single drip emitter, where no further emitters need to be connected to the line.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An adjustable valved coupler for a drip irrigation system, comprising:
- a valve body having a first end and a second end, and defining an internal volume therebetween, wherein a central longitudinal axis is defined through the valve body;
- a selector switch assembly connected to the first end, the selector switch assembly having an inlet cap defining a main port in fluid communication with the internal volume, a dial, a circular seat abutting the second end, and a shaft coupling the dial to the circular seat so that rotation of the dial is directly translated to the circular seat, wherein an eccentrically located aperture is defined through the circular seat; and
- at least two outlets defined through the second end of the valve body, wherein the two outlets are located non-concentrically with respect to the longitudinal axis.

2. The adjustable valved coupler of claim 1, wherein the inlet cap further comprises a second port extending in a direction substantially opposite from the main port.

3. The adjustable valved coupler of claim 2, wherein the main port and the second port are each configured for attachment to a feeder line.

4. The adjustable valved coupler of claim 1, wherein the dial is manually operable.

5. The adjustable valved coupler of claim 1, wherein the dial is positioned on an upper surface of the inlet cap.

6. The adjustable valved coupler of claim 5, wherein an upper end of the shaft extends through the inlet cap and is attached to the dial.

7. The adjustable valved coupler of claim 1, wherein the circular seat abuts an internal surface of the second end.

8. The adjustable valved coupler of claim 7, further comprising a compression spring configured to maintain the circular seat against the internal surface of the second end.

9. The adjustable valved coupler of claim 8, wherein the compression spring circumvolves the shaft from the inlet cap to the circular seat.

10. The adjustable valved coupler of claim 1, comprising three outlets defined through the second end of the valve body.

11. The adjustable valved coupler of claim 10, wherein the three outlets have diameters of about 0.05 inches, 0.08 inches, and 0.10 inches.

12. The adjustable valved coupler of claim 1, wherein the second end further comprises a baffle portion of sufficient area to block the eccentrically located aperture when the selector switch assembly is moved to a no flow position.

13. The adjustable valved coupler of claim 1, wherein the dial is movable among multiple predefined positions defined in an upper surface of the inlet cap, wherein the predefined positions correspond to no flow, low flow, medium flow, and high flow.

14. The adjustable valved coupler of claim 13, wherein each predefined position corresponds to a flow rate for one of the at least two outlets.

15. The adjustable valved coupler of claim 14, wherein the second end includes a baffle portion defining a no flow position and the at least two outlets include any two of a low-flow outlet, a medium-flow outlet, and a high-flow outlet, and wherein:
- when the dial is rotated to the no flow position, the eccentrically located aperture is substantially blocked by the baffle portion;
- when the dial is rotated to the low flow position, the eccentrically located aperture substantially concentrically aligns with the low-flow outlet;
- when the dial is rotated to the medium flow position, the eccentrically located aperture substantially concentrically aligns with the medium-flow outlet; and
- when the dial is rotated to the high flow position, the eccentrically located aperture substantially concentrically aligns with the high-flow outlet.

16. The adjustable valved coupler of claim 1, wherein the inlet cap further comprises a sleeve configured to engage an internal surface of the first end of the valve body.

17. The adjustable valved coupler of claim 1, wherein the inlet cap is removably engaged to the valve body.

18. The adjustable valved couplet of claim 1, wherein the second end of the valve body is configured to couple directly to a drip emitter by friction fit.

19. The adjustable valved coupler of claim 18, wherein the main port is configured to couple directly to a feeder line by friction fit.

20. An adjustable valved coupler for a drip irrigation system, comprising:
- a valve body having an open first end and a second end defining multiple outlets eccentrically located around a perimeter of the second end; and
- a manually operable selector switch assembly connected to the open first end, the selector switch assembly having an inlet cap defining at least one main port configured to fluidically connect a feeder line to an internal volume of the valve body, a manually operable dial, a circular seat, a shaft directly coupling the dial to the circular seat, and an eccentrically located aperture defined through the circular seat, wherein rotation of the dial rotates the circular seat and causes the eccentrically located aperture to move into and out of alignment with one of the multiple outlets.

* * * * *